June 27, 1939.  R. S. SANFORD  2,163,891

CLUTCH CONTROL MECHANISM

Filed March 19, 1934  4 Sheets-Sheet 1

INVENTOR.
ROY S. SANFORD
BY
H.O.Clayton
ATTORNEY.

June 27, 1939.  R. S. SANFORD  2,163,891
CLUTCH CONTROL MECHANISM
Filed March 19, 1934  4 Sheets-Sheet 3

INVENTOR.
ROY S. SANFORD
BY
ATTORNEYS.

Patented June 27, 1939

2,163,891

UNITED STATES PATENT OFFICE 2,163,891

CLUTCH CONTROL MECHANISM

Roy S. Sanford, New York, N. Y., assignor to Bendix Aviation Corporation, South Bend, Ind., a corporation of Delaware Application March 19, 1934, Serial No. 716,249

12 Claims. (Cl. 192—.01)

This invention relates to automotive vehicles and has particular reference to control mechanism for the clutch and transmission thereof.

An object of the invention is to further simplify, and eliminate insofar as possible, the manual operations customarily involved in driving automotive vehicles, particular attention being directed to simplification of the gear shifting operation and elimination of the manual effort customarily required to release the clutch.

A more specific object of the invention is to render a centrifugal clutch mechanism practical under all conditions of service. Hitherto the use of centrifugal clutches in automotive vehicles has been unpractical, because, by the very nature of the structure, the clutch would not automatically disengage until an extremely low motor speed had been reached and because positive disengagement of the clutch at any normal driving speed required considerable effort.

It is accordingly an object of the invention to provide a pressure differential operated motor operative to render the centrifugal clutch mechanism inoperative upon the release of the accelerator and irrespective of the speed of the flywheel.

A further object of the invention is to provide a clutch structure wherein there are two distinct stages of clutch engagement, the first stage being relatively fast and effected by means of yieldable means and the second stage being relatively slow to progressively vary the engagement of the clutch, said latter stage being effected by means of a centrifugally operative mechanism.

Yet another object of the invention is to render a centrifugal clutch mechanism adaptable to an automotive vehicle by associating with the transmission automatically operable means for unloading the same for gear purposes.

Another object of the invention is to provide, in combination with a centrifugal clutch forward of the transmission and a free wheeling unit rearward of the transmission, vacuum operated means having an accelerator operated control valve, said means being operative with the release of the accelerator to render the centrifugal clutch inoperative and the free wheeling unit operative to thereby automatically isolate the transmission upon release of the accelerator and facilitate the changing of gears.

Yet another object is to provide a selector mechanism in conjunction with the aforementioned vacuum operating means, said mechanism being operable to render the free wheeling unit conventionally operative.

A further object of the invention is to provide a free wheeling unit, which is either rendered operative for its intended purpose, that is as a unidirectional drive mechanism, or inoperative as such by means of a pressure differential operated motor controlled by the engine throttle and/or by an accelerator operated three-way valve.

Yet another object of the invention is to provide means for delaying the operation of the aforementioned motor, in rendering the free wheeling unit inoperative as a unidirectional drive mechanism, until after the clutch forward of the transmission is engaged.

By reason of the particular combination and arrangement of mechanism comprising this invention centrifugal clutches may be utilized without involving the disadvantageous features hitherto mentioned, while at the same time retaining the advantageous features inherent in this particular type of clutch; to wit, the automatic disengagement at low speeds and a smoothness of engagement which is difficult to secure in other types of clutches.

Various other objects and meritorious features of the invention will be apparent from the following description, taken in conjunction with the drawings, wherein like numerals refer to like parts throughout the several figures and wherein.

Figure 1:
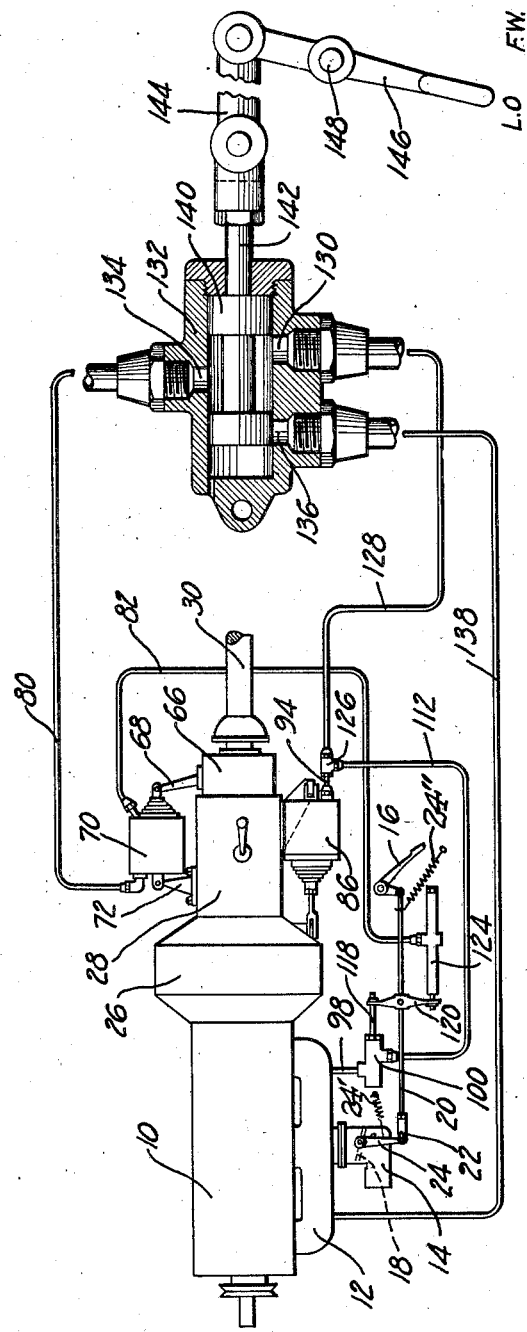
Figure 1 illustrates somewhat diagrammatically one combination involving the improved features of my invention.

Referring now to the drawings, the numeral 10 represents an internal-combustion engine having associated therewith an intake manifold 12 to which is secured a carburetor 14 in the customary fashion. An accelerator pedal 16 is connected to the carburetor, for controlling the throttle valve 18 therein, through an accelerator rod 20, which has a lost motion connection 22 with arm 24, which is connected to the throttle valve. The latter valve and accelerator are maintained in their off positions; that is, throttle closed and accelerator released positions, by springs 24' and 24'' respectively.

Figure 5:
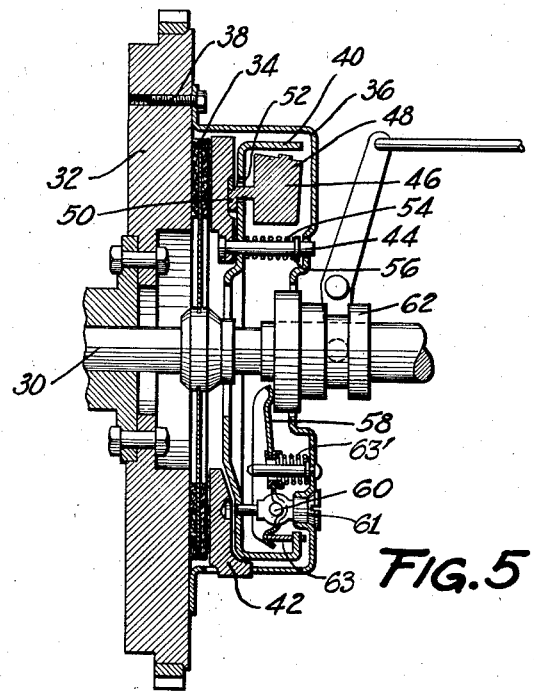
Figure 5 is a sectional view of the centrifugal clutch mechanism and power means cooperating therewith.
Figure 6:
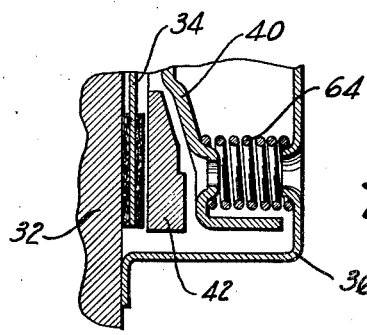
Figure 6 is a fragmentary view of the mechanism of Figure 5, disclosing the power means in operation to render the centrifugal means inoperative.

A centrifugal clutch indicated at 26 operates to couple the engine 10 with the change-speed transmission mechanism indicated generally by the numeral 28, said mechanism being operably connected to a drive shaft 30. The centrifugal clutch, disclosed in detail in Figure 5, comprises a driving or flywheel unit 32 and a driven unit 34, the latter being drivably secured to the drive shaft 30 through the intermediary of the transmission. The driving unit of the clutch includes a housing member 36 secured to the flywheel by fastenings 38. A pressure unit, comprising a stamping 40 and a ring member 42, is drivably secured to the housing member 36 of the rotor unit by pins 44. Centrifugal weight members 46, comprising heads 48 and shank portions 50, are mounted upon the stamping 40, the shank portions extending through openings 52 in the stamping. In operation, the heads 48 are thrown outwardly at or above a critical speed of the driving unit, the shank portions fulcruming, at the openings in the stamping, to force the ring 42 away from the stamping and thereby force the driven member 34 into driving engagement with the flywheel with a force dependent upon the speed of the flywheel. Springs 54, interposed between the stamping 40 and stops 56 on the pins 44, serve to maintain the ring 42 against the stamping and the weights 46 in their off position. Lever members 58, or so-called fingers, are pivoted upon pins 60 mounted in supports 61, the fingers functioning, when acted upon by a collar 62, to force the pressure unit to the right, to the position disclosed in Figure 6. Thrust links 63 serve to interconnect the pressure unit and members 58, the latter being normally held in engagement with the links 63 by springs 63'. In this position of the parts clutch springs 64, interposed between the housing 36 and stamping 40, are compressed. According to an important feature of the invention the springs 64 in their fully expanded position act as stops for the stamping 40, the driving member, driven member and ring member at this time being sufficiently spaced to be just out of contact with one another, as disclosed in Figure 5.

Figure 8:
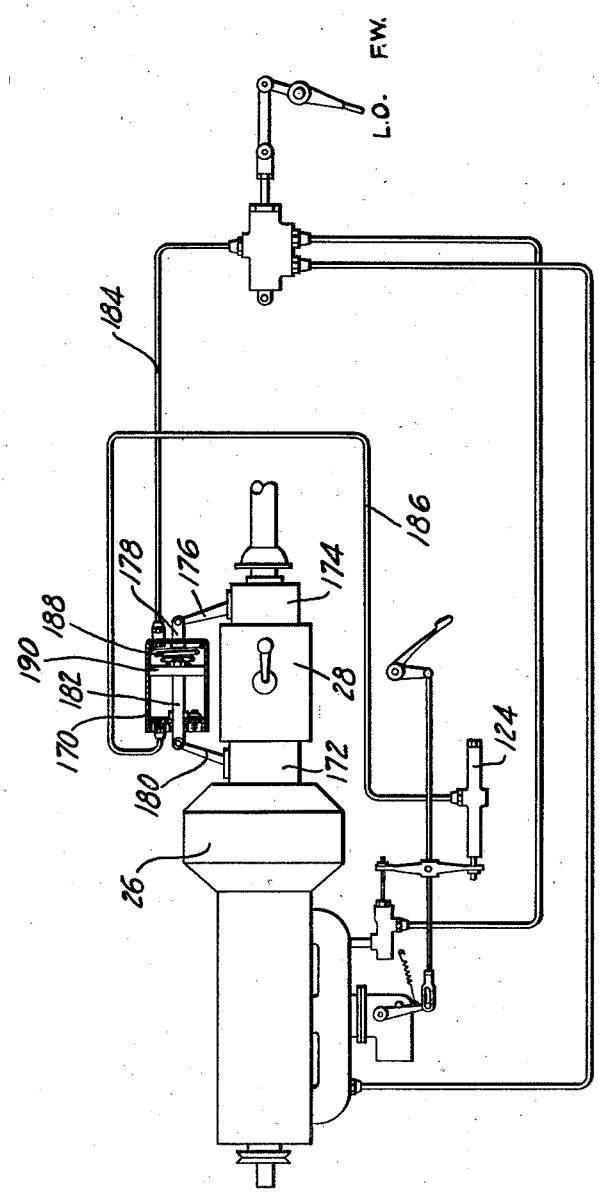
Figure 8 is a sectional view of a conventional type of free wheeling unit or overrunning clutch together with a lock-out mechanism therefor.

A free wheeling or overrunning clutch unit 66 is positioned rearwardly of the transmission and may be selectively thrown either into free wheeling or locked-out position by means of a lever 68. Briefly described, the unit 66, disclosed in Figure 8, comprises driving shaft 69 and the driven or propeller shaft 30. An overrunning clutch 69', which may be of the Horton type, is drivably connected to the shaft 69 and is selectively connected with the shaft 30 by means of a gear 69'' slidably keyed to the shaft 30. The gear 69'' is arranged to be alternately operated by spring and power means respectively to cut-out and cut-in the free wheeling unit. When cut-out, the gear 69'' is moved to the left, Figure 8, to interlock the same with the overrunning clutch, thus rendering the clutch inoperative and providing a bidirectional drive between the driven and driving shafts 30 and 69 respectively. When the free wheeling unit is cut-in, preferably by the aforementioned power means to be described hereinafter, the gear 69'' is moved to the right, Figure 8, thus rendering the overrunning clutch operative and providing a unidirectional drive between shafts 30 and 69.

United States Patent No. 1,963,219 to S. O. White, issued June 19, 1934, shows a free-wheeling unit and lock-out construction, in general similar to that of applicant.

A vacuum booster cylinder 70 is fixedly positioned as by means of a bracket 72 to some convenient portion of the vehicle and includes a piston assembly 74 provided with a piston stem 76 extending through one end of the cylinder and pivotally connected to the lever 68 of the free wheeling unit 66. A coil spring 78 is seated in one end of the cylinder casing and bears upon the piston 74 at its opposite end, normally tending to maintain the free wheeling unit in locked-out position to provide a bidirectional drive mechanism. A vacuum line 80 opens into the cylinder 70 at the end on which the coil spring seats, and an air exhaust line 82 communicates with the opposite end of the cylinder. This latter end of the cylinder is provided with a one-way check valve 84 of conventional structure, which permits the ingress of air into the cylinder as the piston moves away from said end while preventing an exhaust of air therethrough when the piston is moving in the opposite direction.

A clutch booster cylinder or pressure differential operated motor 86 is fixedly secured to the motor assembly in any desirable fashion. This cylinder is provided with a piston assembly 88 having secured thereto a piston stem 90, which is connected by suitable linkage to the clutch actuating collar 62. A coil spring 92 normally tends to maintain the piston 88 in clutch engaging position, and a vacuum line 94 communicates with the interior of the cylinder at that end on which the said coil spring is seated. The piston stem 90 is provided with an exhaust slot 96 extending longitudinally thereof from a point closely adjacent the piston assembly 88.

Figure 2:
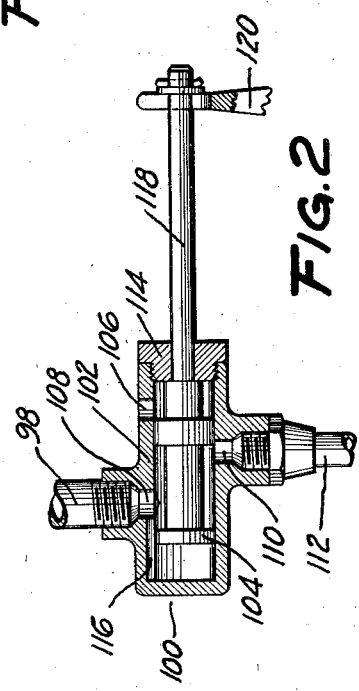
Figure 2 is a section through the primary vacuum control valve.
Figure 3:
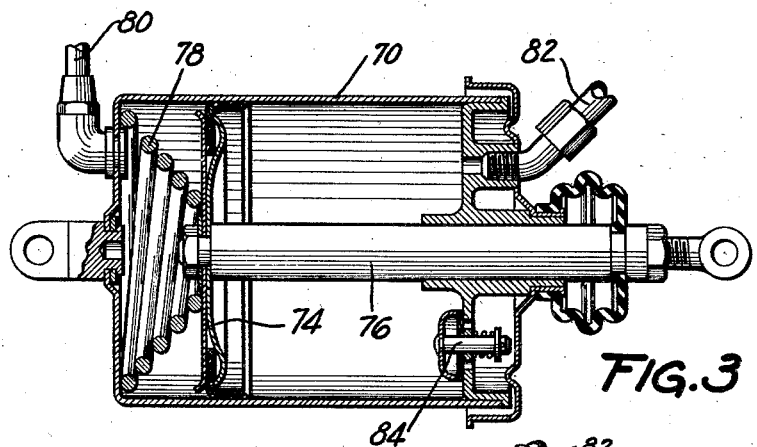
Figure 3 is a section through the free wheeling booster cylinder.
Figure 4:
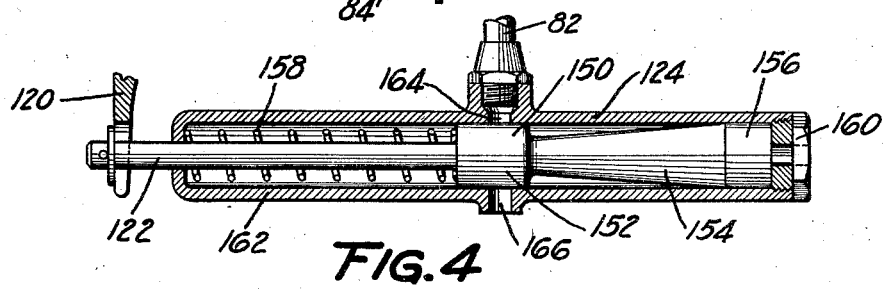
Figure 4 is a section through a bleed valve associated with the free wheeling booster.

A vacuum line 98 connects the intake manifold 12 with what I shall hereafter designate as a primary control vacuum valve 100. This valve is illustrated in some detail in Figure 2 and comprises a valve casing 102 having a spool valve 104 slidable therein. The casing is provided with an air vent 106 and valve ports 108 and 110, providing communication between the casing and vacuum lines 98 and 112. The valve casing is preferably of substantially cylindrical shape, integrally closed at its forward end and closed by means of a threaded plug 114 at its rear end. The interior of the casing at its forward end, beyond the port providing communication with the vacuum line 98, is somewhat larger than the interior of the rear end of the casing. Clearance is therefore provided as indicated at 116 between the forward extremity of the spool valve and the casing, while the rear end of the casing provides a sliding fit for the rear end of the valve. By virtue of this construction the evacuated manifold is constantly in communication with the forward end of the casing 102, which cooperates with the vent 106 to create an ever present force operating on the spool valve 104 to draw the same forwardly to the limit of its movement in the casing.

A stem 118 is secured to the rear of the spool valve 104 and extends through an aperture provided therefor in the closure plug 114. A double-armed bracket 120 is secured in any suitable manner to the accelerator rod 20, each arm including a bifurcated extremity adapted to cooperate respectively with an enlarged head positioned at the extremity of valve stem 118 and a similar enlarged head on the stem 122 of bleed valve 124, to be more accurately described hereinafter. The bracket is so positioned on the accelerator rod that when the accelerator is in its released position the bifurcated arm associated with said bracket retains the spool valve 104 at the rearward limit of its movement. In this position communication between the vacuum line 98 and line 112 is established and the air vent 106 is cut off from communication with the port 110 and its connected vacuum line 112.

The spacing between the valve ports and the length of the spool valve 104 is such that a determined forward movement of the valve is permissible without cutting off this vacuum communication between lines 108 and 110. By reason of the one-way coupling between the stem 118 and the arm of bracket 120, the valve 104 is free to move as soon as the accelerator pedal is depressed, the movement of said valve being limited by the extent of such depression until it reaches the forward end of casing 102. By reason of the fact that a vacuum is maintained in the forward portion of the valve casing at all times during operation of the motor, valve 104 will be urged forwardly as soon as the accelerator is depressed. When the valve 104 reaches the forward limit of its movement, communication between the vacuum lines 98 and 112 is cut off.

The vacuum line 112 extends to a three-way fitting 126, one arm of which is connected with the vacuum line 94 opening into the clutch control booster 86 and the other arm of which is connected to a vacuum line 128 communicating with port 130 in a selector valve 132, the latter operating to control the energization or deenergization of the booster cylinder 70 for a purpose to be described in detail hereinafter. Valve 132 includes the ports 134 and 136, which are connected respectively with the vacuum line 80 extending to the free wheeling booster cylinder 70 and a vacuum line 138 in direct communication with the intake manifold 12.

Within the valve casing is a spool valve 140 operable in one position to provide communication between ports 130 and 134 while closing communication between ports 134 and 136 and in another position to reverse such communication. Valve 140 is provided with a valve stem 142 extending through one end of the valve casing and pivotally connected to a link 144, the other end of which link is pivotally connected to one end of an arm 146 pivoted intermediate its ends as at 148. Manipulation of the other end of the arm operates to selectively move the valve 140 into either a free wheeling or locked out position as indicated in Figure 1 of the drawings.

The operation of the structure will now be set forth. Assuming the accelerator 16 to be in released position and the control valve 140 to be in the position illustrated in Figure 1 for maintaining the free wheeling unit normally in locked-out position, vacuum communication is established between the intake manifold 12 and the clutch booster cylinder 86 through primary control valve 100 and vacuum lines 98, 112 and 94. Vacuum communication between the manifold and the free wheeling booster 70 is established at the same time through line 98, valves 100 and 132, and lines 112, 128 and 80.

The result is that the clutch booster 86 operates to disengage the clutch members of centrifugal clutch 26, and the free wheeling booster 66 operates against the resistance of spring 78 to actuate the arm 68, thereby throwing the free wheeling unit 66 from locked-out into free wheeling position. The gripping engagement of the clutch members utilized in centrifugal clutches is quite strong and only at an extremely low motor speed do the respective members become automatically disengaged. For that reason the clutch booster 86 is desirable for the purpose of disengaging the clutch members when the vehicle is travelling at any substantial rate of speed. Otherwise, it would be necessary, before shifting gears, to wait until the motor speed had dropped sufficiently to permit automatic disengagement of the centrifugal clutch members. In this operation the booster is energized, the piston 88 thereof moving to operate the collar 62, fingers 58 and all interconnected parts to force the plate 40 to the right and render the centrifugal mechanism inoperative irrespective of the speed of the clutch driving unit.

Figure 7:
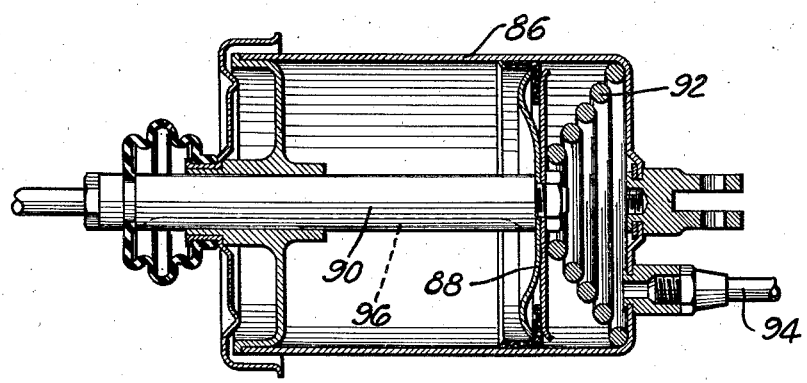
Figure 7 is a section through the clutch control booster illustrated in Figure 1.

On subsequent depression of the accelerator pedal 16 the bracket 120 is moved forwardly, thereby permitting the spool valve 104 in primary control valve 100 to move forwardly under the influence of the vacuum in the valve casing and cut off vacuum communication between lines 98 and 112. At the same time vacuum line 112 is vented to the atmosphere through the port 106 in the primary control valve, the air passing through the vacuum lines to vent both the clutch booster 86 and the free wheeling booster 70. The slot 96, Figure 7, permits a rapid exhaust of air from within the clutch booster cylinder as the piston 88 is urged into clutch engaging position by means of the spring 92. However, the rapid engaging movement of the pressure unit is terminated when the springs 92 are fully expanded, and thereafter the clutch engagement is controlled by the action of the centrifugal mechanism; thus there is provided a clutch mechanism insuring a relatively rapid yet controlled clutch engagement irrespective of whether the clutch is being engaged with the vehicle at rest or in motion. The centrifugally operated weights 46 function to progressively vary the engagement of the clutch in direct proportion to the speed of the engine, thus providing a so-called cushioned engagement of the clutch.

Simultaneously with the foregoing, depression of the accelerator 16 actuates the valve 150 in the bleed valve 124 through forward movement of the lower arm of bracket 120, which is connected through a one-way coupling with an enlarged head 152 fixedly secured to the extremity of valve stem 122. Valve 150 includes tapered end portion 154 which merges into a shouldered portion 156, the extreme end of the tapered portion and the shoulder being provided with a sliding fit in the valve casing. The opposite side of shoulder 150 provides a seat for coil spring 158, the other extremity of which seats upon the closed end of said casing. A threaded closure 160 serves to close the open end of casing 162.

With the accelerator 16 in released position the shoulder 152 of the bleed valve closes communicating ports 164 and 166, the former of which is coupled with the exhaust line 82 from the free wheel booster. As the accelerator is depressed, the shoulder 152 slides forwardly in the valve casing 162, but the shoulder is of sufficient length to prevent the establishment of communication between ports 164 and 166 during a substantial interval. This interval is provided in order that the clutch may become engaged and the motor may pick up the drive shaft 30 through the free wheeling unit in a positive normal manner prior to operation of the free wheeling booster to throw the free wheeling unit back into locked-out position. The length of shoulder 152 is designed to provide the necessary interval, after which communication between ports 164 and 166 is established in its maximum capacity by registration with said ports of the restricted portion of tapered valve 154. As the accelerator is further depressed, the capacity for exhausting air through the bleed valve from the free wheeling booster through line 82 becomes less and a cushioning effect is produced for the final actual change from free wheeling into locked-out position.

Upon release of the accelerator the spring 158 forces the valve 150 in bleed valve casing 162 back into its exhaust cut-off position.

When the manually operated lever 146 is thrown into free wheeling position, permanent communication between the ports 134 and 136 of the free wheeling selector valve 132 is established. Under these circumstances there is provided a direct connection from the manifold 12, through line 138, valve 132 and line 80, to the free wheeling booster 70. By virtue of such unimpeded connection, the booster is at all times energized to render the free wheeling unit operative to provide a unidirectional drive mechanism. This is true for the manifold is always sufficiently evacuated, either by the vehicle acting as a prime mover to drive the engine or by the engine driving the vehicle.

It is apparent that with the mechanism described there is provided vacuum means for controlling a free wheeling unit in combination with a second vacuum means, interlocked with the first vacuum means, for controlling a centrifugal clutch, such that both the free wheeling unit and clutch are rendered operative, only at closed throttle, to isolate the transmission to facilitate gear shifting. At all other times during the operation of the throttle, and above a relatively low speed of the flywheel, the engine and drive shaft are positively coupled to thus employ the engine as a brake. This interlocked vacuum system, however, is quickly changed over to a so-called free wheeling system by a simple operation of the selector valve.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In an automotive vehicle provided with a transmission, an accelerator, a centrifugal clutch forward of the transmission and a free wheeling unit rearward of the transmission, accelerator controlled vacuum means operable upon release of the accelerator to isolate the transmission by rendering the centrifugal clutch inoperative and the free wheeling unit operative as a unidirectional drive mechanism to thereby facilitate operation of the transmission, and selector means for rendering the vacuum means operative upon the free wheeling unit irrespective of the position of the accelerator.

2. In an automotive vehicle provided with a clutch structure comprising driving and driven members, means for forcing said members together comprising centrifugally operated members and a pressure plate, yieldable means acting on said plate to bias the same to a position whereby the driven clutch member is just short of contact with the driving clutch member, and vacuum operated means operable to render said yieldable means inoperative by moving both the centrifugal members and the pressure plate to an inoperative position.

3. An automotive vehicle provided with an engine, a change-speed transmission, and a drive shaft, a clutch forward of the transmission for coupling and uncoupling the engine from the transmission, a free wheeling unit rearwardly of the transmission for coupling and uncoupling the transmission from the drive shaft, vacuum operated means for controlling the operation of said clutch, other vacuum operated means, interlocked with said first-mentioned vacuum means, for rendering said free wheeling unit either operative or inoperative as a unidirectional drive mechanism, a primary control valve operable to so control both vacuum means as to substantially simultaneously render the free wheeling unit operative as a unidirectional drive and disengage the clutch, together with a selector valve operable to isolate the vacuum means from each other, whereby the free wheeling unit is rendered conventionally operative.

4. An automotive vehicle provided with an engine, a change-speed transmission, and a drive shaft, a clutch forward of the transmission for coupling and uncoupling the engine from the transmission, a free wheeling unit rearwardly of the transmission for coupling and uncoupling the transmission from the drive shaft, vacuum operated means for controlling the operation of said clutch, other vacuum operated means, interlocked with said first-mentioned vacuum means, for rendering said free wheeling unit either operative or inoperative as a unidirectional drive mechanism, a primary control valve operable at closed throttle only to so control both vacuum means as to substantially simultaneously render the free wheeling unit operative as a unidirectional drive and disengage the clutch, together with a selector valve operable to isolate the vacuum means from each other and connect the second-mentioned vacuum means directly with the manifold of the engine, whereby the free wheeling unit is rendered conventionally operative as a unidirectional drive mechanism.

5. In combination with an automotive vehicle provided with a centrifugal clutch, a drive shaft and a transmission mechanism, means for automatically disconnecting the rear of the transmission from the drive shaft upon release of the accelerator, and accelerator control means operable to delay recoupling of the transmission and drive shaft upon subsequent depression of said accelerator to permit said centrifugal clutch to engage prior to such coupling.

6. In combination with an automotive vehicle provided with a transmission, an accelerator and a centrifugal clutch, a free wheeling unit positioned at the rear of said transmission, power operated mechanism operable by release of said accelerator for automatically throwing said free wheeling unit into free wheel position upon release of the accelerator, and accelerator control mechanism positioned in said power line operable on depression of said accelerator to delay the normal locking out of said free wheeling unit for a predetermined interval.

7. In an automotive vehicle provided with an accelerator, a propeller shaft, a change-speed transmission and an engine, a clutch interposed between said engine and transmission, and an overrunning clutch interposed between said transmission and shaft, power means for operating said clutches, and manually operated selectively operable valvular means for so controlling the operation of said power means as to either render the second-mentioned clutch operative at all times as an overrunning clutch or render said second-mentioned clutch operative as an overrunning clutch and disengage said first-mentioned clutch only upon completely releasing the accelerator.

8. In an automotive vehicle provided with an accelerator, a propeller shaft, a change-speed transmission and an engine, a clutch interposed between said engine and transmission, and an overrunning clutch interposed between said transmission and shaft, power means for operating said clutches, and selectively operable valvular means, including an accelerator operated valve and a manually operable selector valve, for so controlling the operation of said power means as to either render the second-mentioned clutch operative at all times as an overrunning clutch or render said second-mentioned clutch operative as an overrunning clutch and disengage said first-mentioned clutch only upon completely releasing the accelerator.

9. In an automotive vehicle provided with an engine, a transmission and a propeller shaft, a clutch for interconnecting said engine and transmission, and an overrunning clutch for interconnecting said transmission and shaft, power means for operating said clutches, said power means including a selector valve operable, in one selected position, to at all times during the operation of the engine render said power means operative to make the overrunning clutch operative as a unidirectional drive mechanism and operable, in another selected position together with other valve means, to render said overrunning clutch operative as a unidirectional drive mechanism and to effect a disengagement of the first-mentioned clutch to thereby isolate the transmission from the engine and propeller shaft and facilitate an operation of the transmission.

10. In an automotive vehicle provided with an engine, an accelerator, a transmission, a propeller shaft, a clutch interposed between said engine and transmission, and an overrunning clutch interposed between said transmission and propeller shaft, power means for operating said clutches including a pressure differential operated motor operable when energized to render said overrunning clutch operative as a unidirectional drive mechanism, and further including a pressure differential operated motor operating when energized to disengage said first-mentioned clutch, said power means further including an accelerator operated valve mechanism, and mechanism operative to effect successive fast and slow stages of clutch engaging operations of said first-mentioned motor.

11. In an automotive vehicle provided with a combined centrifugal and spring operated clutch and an accelerator, a pressure differential operated motor operable when energized to render the clutch operating spring means of said clutch inoperative, and an accelerator operated valve for controlling the operation of said motor.

12. In an automotive vehicle provided with a free wheeling unit, means for rendering said unit inoperative as a unidirectional drive mechanism, and vacuum operated means acting upon said first-mentioned means comprising a cylinder member, a reciprocable piston member therein, and valvular means for controlling the degree of gaseous pressure within said cylinder member.

ROY S. SANFORD.